United States Patent
Kandasamy (10) Patent No.: US 9,562,715 B2
(45) Date of Patent: Feb. 7, 2017

(54) POWER REGULATION SYSTEM FOR A MOBILE ENVIRONMENT-CONTROLLED UNIT AND METHOD OF CONTROLLING THE SAME

(75) Inventor: Vaitheeswaran Kandasamy, Barcelona (ES)

(73) Assignee: THERMO KING CORPORATION, Minneapolis, MN (US)

( * ) Notice: Subject to any disclaimer, the term of this patent is extended or adjusted under 35 U.S.C. 154(b) by 271 days.

(21) Appl. No.: 13/425,998

(22) Filed: Mar. 21, 2012

(65) Prior Publication Data

US 2013/0248165 A1    Sep. 26, 2013

(51) Int. Cl.
B60H 1/32       (2006.01)
F25D 29/00      (2006.01)

(52) U.S. Cl.
CPC ....... *F25D 29/003* (2013.01); *F25B 2327/001* (2013.01); *F25D 2700/12* (2013.01)

(58) Field of Classification Search
CPC ... B60H 1/3208; B60H 1/3222; B60H 1/3226; B60H 2001/3273; F25B 27/005; F25B 2327/001
USPC ........ 62/61, 133, 236, 237, 323.3, 134, 239, 62/243; 700/246; 123/406.53
See application file for complete search history.

(56) References Cited

U.S. PATENT DOCUMENTS

| | | | |
|---|---|---|---|
| 3,283,525 A | 11/1966 | Fricke et al. | |
| 3,300,619 A * | 1/1967 | Nilssen | B60H 1/034 165/43 |
| 3,325,650 A * | 6/1967 | Barnes | H02P 9/04 290/40 R |
| 3,345,517 A * | 10/1967 | Smith | H02J 9/08 290/30 R |

(Continued)

FOREIGN PATENT DOCUMENTS

| | | |
|---|---|---|
| JP | 2001324253 | 11/2001 |
| JP | 2010286149 | 12/2010 |
| WO | 2011028514 | 3/2011 |

OTHER PUBLICATIONS

International Search Report and Written Opinion for Application No. PCT/US2013/031183 dated Jun. 21, 2013 (11 pages).

(Continued)

*Primary Examiner* — Len Tran
*Assistant Examiner* — Kirstin Oswald
(74) *Attorney, Agent, or Firm* — Hamre, Schumann, Mueller & Larson, P.C.

(57) ABSTRACT

A mobile environment-controlled unit comprising a chassis, a compartment supported by the chassis, and an environmental-control system in environmental communication with the compartment. The environmental-control system is configured to control an environmental parameter of the compartment. The environmental-control system includes an AC Alternator and a controller. The AC alternator is powered by an internal combustion engine and supplies electrical power for the environmental-control system. The (Continued)

controller is configured to monitor the environmental parameter of the compartment, monitor one or more electrical parameters of the AC alternator, control the environmental-control system based on the monitored environmental parameter, and control the AC alternator based on the monitored parameters of the alternator.

20 Claims, 7 Drawing Sheets

(56) References Cited

U.S. PATENT DOCUMENTS

| | | | | |
|---|---|---|---|---|
| 3,617,857 A * | 11/1971 | Gunderson | ............. | H02J 7/242 322/28 |
| 3,655,991 A * | 4/1972 | Schneider | ................. | G05F 1/44 290/50 |
| 3,676,694 A * | 7/1972 | Schneider | ............. | B23K 9/1012 219/134 |
| 3,702,433 A * | 11/1972 | Gilchrist | ................. | H02J 7/247 322/28 |
| 3,716,774 A * | 2/1973 | Lace | ............. | H02P 9/30 320/123 |
| 4,214,198 A * | 7/1980 | Schneider | ............. | H02J 7/1423 307/16 |
| 4,324,286 A * | 4/1982 | Brett | ................. | B60H 1/00371 165/202 |
| 4,330,743 A * | 5/1982 | Glennon | ................. | F02N 11/04 290/38 R |
| 4,496,897 A * | 1/1985 | Unnewehr et al. | ............. | 322/25 |
| 4,592,323 A * | 6/1986 | Vest | ............. | B61C 9/24 123/196 AB |
| 4,827,393 A * | 5/1989 | Clark | ................. | H02M 3/156 322/28 |
| 4,923,025 A * | 5/1990 | Ellers | ................. | B60K 6/44 180/65.23 |
| 5,065,587 A * | 11/1991 | Howland | ............. | B60H 1/3232 200/61.62 |
| 5,249,429 A * | 10/1993 | Hanson | ................. | B60H 1/3208 62/126 |
| 5,253,700 A * | 10/1993 | Early, Jr. | ................. | B60H 1/323 165/42 |
| 5,265,435 A | 11/1993 | Richardson | | |
| 5,298,851 A * | 3/1994 | DeNardis | ................. | G05F 1/575 322/28 |
| 5,323,102 A * | 6/1994 | Torii | ................. | H02J 7/1423 322/90 |
| 5,376,866 A | 12/1994 | Erdman | | |
| 5,376,876 A * | 12/1994 | Bauser | ................. | G11C 27/024 322/28 |
| 5,402,007 A * | 3/1995 | Center | ................. | H02J 7/1446 123/367 |
| 5,506,492 A * | 4/1996 | Harris | ............. | 322/28 |
| 5,561,602 A * | 10/1996 | Bessler | ................. | B60L 3/00 123/41.13 |
| 5,573,181 A | 11/1996 | Ahmed | | |
| 5,589,743 A * | 12/1996 | King | ............. | 318/139 |
| 5,606,244 A * | 2/1997 | Migdal | ................. | H02J 9/066 307/16 |
| 5,629,567 A * | 5/1997 | Kumar | ................. | B60L 3/0038 290/3 |
| 5,637,985 A * | 6/1997 | Kakizaki et al. | ............. | 322/28 |
| 5,730,094 A * | 3/1998 | Morris | ................. | 123/192.1 |
| 5,899,081 A * | 5/1999 | Evans | ................. | B60H 1/00428 62/126 |
| 5,950,440 A * | 9/1999 | Niimi | ................. | B60H 1/3205 62/133 |
| 5,957,633 A * | 9/1999 | Hall | ................. | B23B 51/009 407/113 |
| 5,957,663 A * | 9/1999 | Van Houten | ....... | B60H 1/00828 123/41.12 |
| 6,220,045 B1 * | 4/2001 | Kim | ............. | 62/228.4 |
| 6,275,012 B1 * | 8/2001 | Jabaji | ................. | H02K 19/34 322/22 |
| 6,317,339 B1 * | 11/2001 | Shimazaki | ................. | H02J 3/38 363/37 |
| 6,323,625 B1 * | 11/2001 | Bhargava | ................. | F01D 15/10 322/32 |
| 6,353,306 B1 * | 3/2002 | Mixon | ................. | H02J 7/1453 320/137 |
| 6,414,832 B1 * | 7/2002 | Crecelius | ............. | H02J 7/1461 361/106 |
| 6,466,024 B1 * | 10/2002 | Rogers | ................. | B60L 11/1861 324/427 |
| 6,515,456 B1 * | 2/2003 | Mixon | ................. | H02J 7/1453 320/137 |
| 6,516,621 B2 * | 2/2003 | Homan | ............. | B60H 1/00735 62/133 |
| 6,622,505 B2 | 9/2003 | Anderson et al. | | |
| 6,640,562 B2 * | 11/2003 | Odachi | ................. | B60H 1/3222 62/133 |
| 6,651,450 B1 * | 11/2003 | Tamegai | ............. | B60H 1/3222 62/133 |
| 6,681,583 B2 * | 1/2004 | Taguchi | ................. | B60H 1/3225 62/133 |
| 6,786,055 B2 * | 9/2004 | Inoue | ................. | B60H 1/3208 417/16 |
| 6,863,139 B2 * | 3/2005 | Egami | ................. | B60H 1/3222 180/53.8 |
| 6,925,826 B2 * | 8/2005 | Hille | ................. | B60H 1/00371 62/244 |
| 6,932,148 B1 * | 8/2005 | Brummett | ........... | B60H 1/00378 123/142.5 R |
| 7,023,102 B2 * | 4/2006 | Itoh | ................. | B60W 10/26 290/20 |
| 7,209,850 B2 * | 4/2007 | Brott | ................. | G01R 31/006 324/398 |
| 7,283,899 B1 * | 10/2007 | Harmon | ................. | H02J 7/242 322/23 |
| 7,347,056 B2 * | 3/2008 | Anyoji | ............. | B60H 1/00764 62/133 |
| 7,392,662 B2 * | 7/2008 | Gao | ................. | B60H 1/00764 165/42 |
| 7,427,849 B2 | 9/2008 | Kaneko et al. | | |
| 7,443,142 B2 * | 10/2008 | O'Gorman | ............. | H02J 7/1492 322/24 |
| 7,673,466 B2 * | 3/2010 | Pacy | ................. | B60H 1/00014 62/236 |
| 7,859,230 B2 * | 12/2010 | Rozman | ................. | H02M 1/14 322/24 |
| 2001/0024102 A1 * | 9/2001 | Egami | ................. | B60K 6/22 318/801 |
| 2002/0027425 A1 * | 3/2002 | Asao | ................. | H02J 7/1438 322/28 |
| 2002/0097026 A1 * | 7/2002 | Kernahan | ............. | H02J 7/1438 322/28 |
| 2002/0112492 A1 * | 8/2002 | Suitou | ................. | B60H 1/3205 62/225 |
| 2003/0000236 A1 * | 1/2003 | Anderson | ........... | B60H 1/00421 62/228.3 |
| 2003/0025481 A1 * | 2/2003 | Bertness | ............. | G01R 31/3627 320/155 |
| 2003/0034759 A1 * | 2/2003 | Griffin | ................. | H02P 9/30 322/28 |
| 2003/0039130 A1 * | 2/2003 | Curtiss | ................. | G05F 1/613 363/37 |
| 2003/0097848 A1 * | 5/2003 | Egami | ................. | B60H 1/3222 62/133 |
| 2003/0140880 A1 * | 7/2003 | Kahlon | ................. | B60K 6/485 123/179.3 |
| 2003/0204294 A1 * | 10/2003 | Gluch | ................. | B62D 5/0457 701/41 |
| 2003/0213252 A1 * | 11/2003 | Kuribayashi | ........ | B60H 1/3208 62/133 |
| 2004/0079098 A1 * | 4/2004 | Uno | ................. | B60H 1/322 62/236 |
| 2004/0148952 A1 * | 8/2004 | Ramirez | ................. | H02K 53/00 62/236 |

(56) References Cited

U.S. PATENT DOCUMENTS

| | | | |
|---|---|---|---|
| 2004/0200230 A1* | 10/2004 | Holt | B60H 1/3222 62/243 |
| 2005/0035657 A1* | 2/2005 | Brummett | B60H 1/3226 307/10.1 |
| 2005/0086968 A1* | 4/2005 | Runk | B60H 1/322 62/323.3 |
| 2005/0117423 A1* | 6/2005 | Ishikawa | B60K 6/28 365/203 |
| 2005/0173924 A1* | 8/2005 | French | H02J 7/0068 290/1 A |
| 2005/0268632 A1* | 12/2005 | Yonekura | B60H 1/00421 62/236 |
| 2006/0037352 A1* | 2/2006 | Cho | F25B 13/00 62/323.3 |
| 2006/0162359 A1* | 7/2006 | Fujiki | B60H 1/3208 62/236 |
| 2006/0232248 A1* | 10/2006 | Lawahmeh | H02J 1/10 322/22 |
| 2007/0052241 A1* | 3/2007 | Pacy | B60H 1/00014 290/1 R |
| 2007/0068181 A1* | 3/2007 | Kim | 62/228.1 |
| 2007/0158947 A1* | 7/2007 | Annen | F02B 63/04 290/1 R |
| 2007/0221370 A1* | 9/2007 | Allen | B60H 1/00428 165/202 |
| 2007/0289325 A1* | 12/2007 | Stone | B60H 1/3226 62/323.1 |
| 2008/0006045 A1* | 1/2008 | Brummett | B60H 1/3226 62/236 |
| 2008/0011007 A1* | 1/2008 | Larson | B60H 1/00428 62/323.2 |
| 2008/0196436 A1* | 8/2008 | Connell | B60H 1/00378 62/323.3 |
| 2008/0224671 A1* | 9/2008 | Kimura | H02P 9/305 322/19 |
| 2008/0265812 A1* | 10/2008 | Adra | B60L 11/04 318/375 |
| 2008/0303459 A1* | 12/2008 | Furukawa | B60K 6/46 318/142 |
| 2008/0309094 A1* | 12/2008 | Molen | F02D 29/02 290/40 C |
| 2009/0133419 A1* | 5/2009 | Matsuno | B60P 3/20 62/239 |
| 2009/0167255 A1* | 7/2009 | Rozman | H02M 1/14 322/25 |
| 2009/0228149 A1 | 9/2009 | Alston | |
| 2009/0229288 A1* | 9/2009 | Alston | B60H 1/00428 62/236 |
| 2009/0301702 A1* | 12/2009 | Zeigler | B60H 1/00378 165/202 |
| 2009/0314019 A1* | 12/2009 | Fujimoto | B60H 1/3222 62/228.5 |
| 2010/0000241 A1* | 1/2010 | Kitano | B60H 1/00014 62/134 |
| 2010/0045105 A1 | 2/2010 | Bovio et al. | |
| 2010/0084916 A1* | 4/2010 | Kumar | B60L 9/00 307/9.1 |
| 2010/0180614 A1* | 7/2010 | Larson | B60H 1/00428 62/239 |
| 2010/0241283 A1* | 9/2010 | Desai | H02J 7/1415 700/295 |
| 2010/0276993 A1* | 11/2010 | King | B60L 11/12 307/9.1 |
| 2011/0000244 A1 | 1/2011 | Reason et al. | |
| 2011/0030399 A1 | 2/2011 | Lifson et al. | |
| 2011/0218698 A1* | 9/2011 | Bissontz | B60L 11/00 701/22 |
| 2012/0049638 A1* | 3/2012 | Dorn | H02J 3/42 307/87 |
| 2013/0248165 A1* | 9/2013 | Kandasamy | F25D 29/003 165/271 |

OTHER PUBLICATIONS

Chinese Office Action in Corresponding Chinese Application No. 2013800262830 issued Mar. 3, 2016 (4 pages), English Translation.

\* cited by examiner

POWER REGULATION SYSTEM FOR A MOBILE ENVIRONMENT-CONTROLLED UNIT AND METHOD OF CONTROLLING THE SAME

BACKGROUND

Embodiments of the invention relate to a mobile environment-controlled unit, such as an over-the-road compartment trailer, having an environmental-control system, such as a refrigeration unit, powered by an engine.

In a prior transport refrigeration unit, the electrical power for the unit is generated by an alternator powered with an internal combustion vehicle engine. The alternator power is used to charge the battery, i.e., via a rectifier, and the battery power is utilized by electrical components in the refrigeration unit. If alternating current (AC) components are used in the refrigeration unit, a power electronics module is used to convert the battery DC power to AC output power, which is then distributed to the AC electrical components.

SUMMARY

In one embodiment, the invention provides a mobile environment-controlled unit comprising a chassis, a compartment supported by the chassis, and an environmental-control system in environmental communication with the compartment. The environmental-control system is configured to control an environmental parameter of the compartment. The environmental-control system includes an AC Alternator and a controller. The AC alternator is powered by an internal combustion engine and supplies electrical power for the environmental-control system. The controller is configured to monitor the environmental parameter of the compartment, monitor one or more electrical parameters of the AC alternator, control the environmental-control system based on the monitored environmental parameter, and control the AC alternator based on the monitored parameters of the alternator.

In another embodiment the invention provides a method of operating a mobile environment-controlled unit. The method comprises monitoring an environmental parameter of a compartment, monitoring one or more electrical parameters of an AC alternator, controlling an environmental-control system based on the monitored environmental parameter, and controlling the AC alternator based on the monitored parameters of the alternator.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In one implementation, a controller and related control method controls AC power in a mobile environment-controlled unit. The controller is configured to control the AC and DC loads, and the power to the loads. The controller is further configured to control the AC output power from an alternator, by controlling the alternator's rotor field current. By having the controller control the loads, the power to the loads, as well as the output of the alternator, the controller provides more flexibility in the control of the mobile environment-controlled unit.

Figure 1:
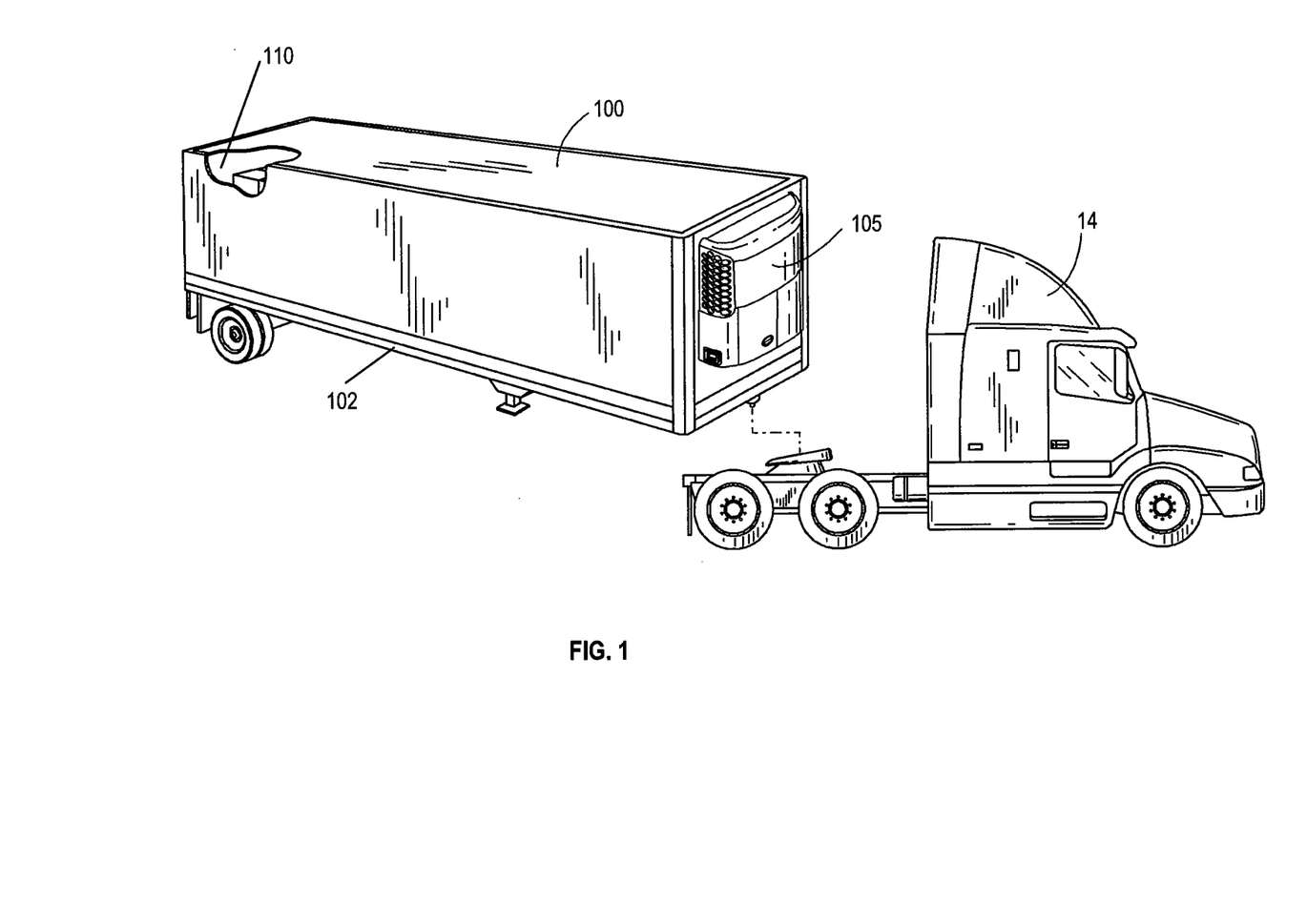
FIG. 1 is a perspective view of an over-the-road tractor and semi-trailer.

Embodiments of the invention relate to a mobile environment-controlled unit having an environmental-control system and a compartment. Exemplary mobile environment-controlled units include an over-the-road trailer, over-the-road truck body, bus, transport container, and railway car. The compartment can take the form of multiple compartments or have multiple zones. An exemplary environmental-control system includes a refrigeration system, heating system, humidity system, and air-quality system. In the specific example discussed below, the environment-controlled unit is an over-the-road refrigerated semi trailer 100 (FIG. 1) having a chassis 102 supporting (or forming) a single compartment 110 cooled by a refrigeration unit 105. The chassis 102 also supports the refrigeration unit 105.

Figure 2:
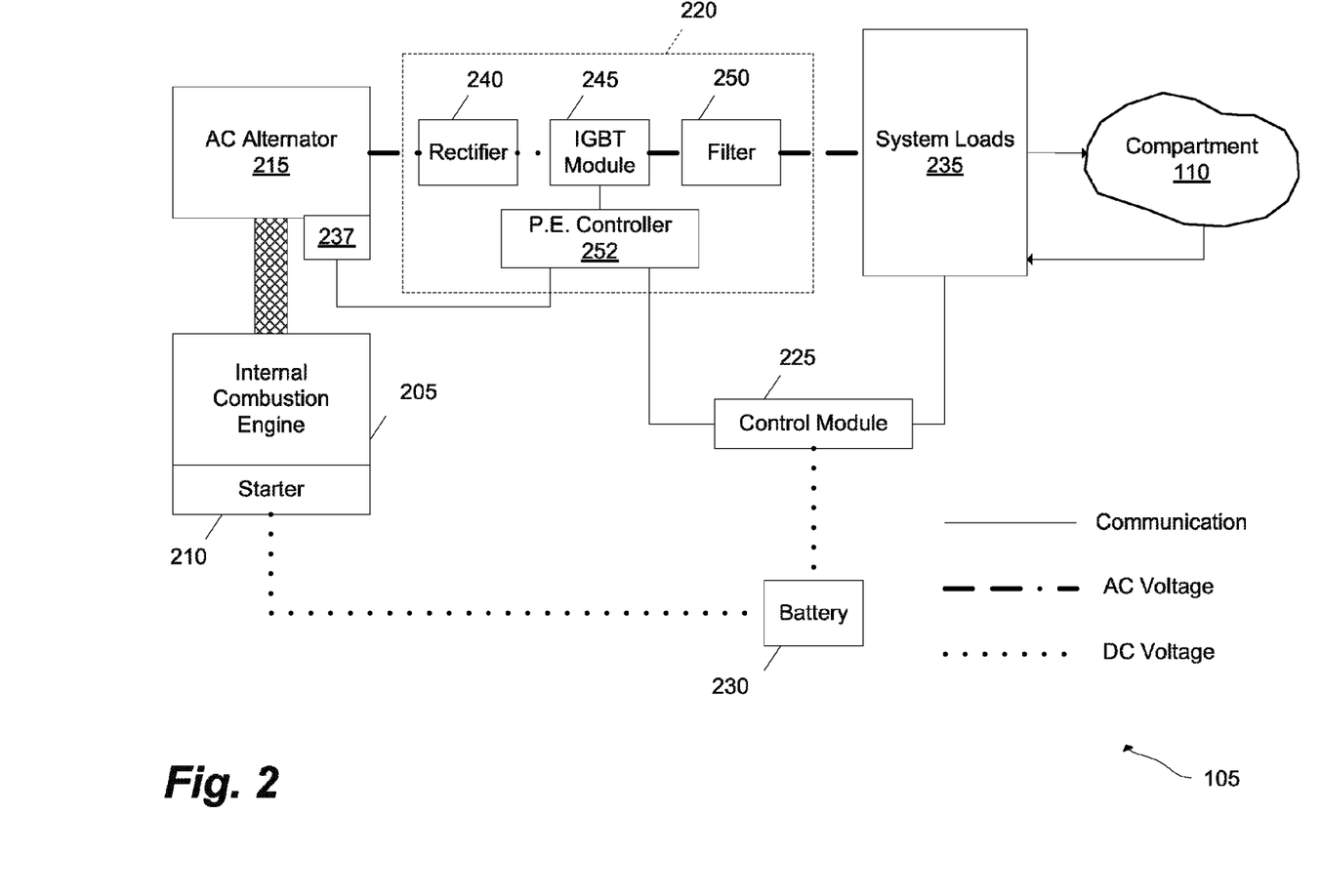
FIG. 2 is a block diagram of a refrigeration unit of the semi-trailer of FIG. 1.

As shown in FIG. 2, the refrigeration unit 105 includes an internal combustion engine 205, with a starter 210, an AC alternator 215, a power electronics module 220, a control module 225, a battery 230, and system loads 235.

The internal combustion engine 205 may be an engine that runs on diesel fuel, gasoline, or other suitable material. The internal combustion engine 205 provides mechanical power. The starter 210 is used to start the engine 204 and is powered by the battery 230. In another embodiment the refrigeration unit 105 receives power from an internal combustion engine of the main vehicle, rather than an internal combustion engine 205 of the refrigeration unit.

The AC alternator 215 is coupled to the internal combustion engine 205 via a belt or other means. The AC alternator 215 converts the mechanical energy produced by the internal combustion engine 205 into AC electrical power. The AC alternator 215 includes stator field windings, known as a stator, and rotor field windings, known as a rotor. As is known in the art, the rotor is rotated by the internal combustion engine 205 via the belt. As the rotor rotates electrical power is produced. The AC alternator 215 includes an alternator voltage regulator 237. The alternator voltage regulator 237 monitors the AC output voltage of the AC alternator 215. The alternator voltage regulator 237 regulates the AC output voltage by adjusting the field current based on a predicted AC alternator 215 speed. The AC alternator 215 speed is predicted using the monitored AC output voltage. The alternator voltage regulator 237 includes a rectifier. The rectifier converts part of the AC alternator 215 AC power into DC power. The rectified DC power is then used to adjust the field current and thus regulate the AC output voltage of the AC alternator 215. In another embodiment, the alternator voltage regulator 237 is included within the power electronics module 220.

The power electronics module 220 is electrically coupled to the AC alternator 215. The power electronics module 220 includes a rectifier 240, an insulated gate bipolar transistor or IGBT module 245, a filter 250, and a power electronics controller 252. The rectifier 240 is a pulse-width modulated (PWM) rectifier. The rectifier 240 receives AC voltage from the AC alternator 215. The rectifier 240 converts the AC voltage to controlled or regulated DC voltage using forced commutated power electronic semiconductor switches. The rectifier 240 is electrically coupled to the IGBT module 245. The IGBT module 245 receives the rectified DC voltage from the rectifier 240. The IGBT module 245 is an inverter that inverts the DC voltage from the rectifier into a square wave AC voltage. The filter 250 is electrically coupled to the IGBT module 245. The filter 250 filters the AC voltage from the IGBT module 245. The power electronics controller 252 communicates with the control module 225 and AC alternator 215.

Figure 3:
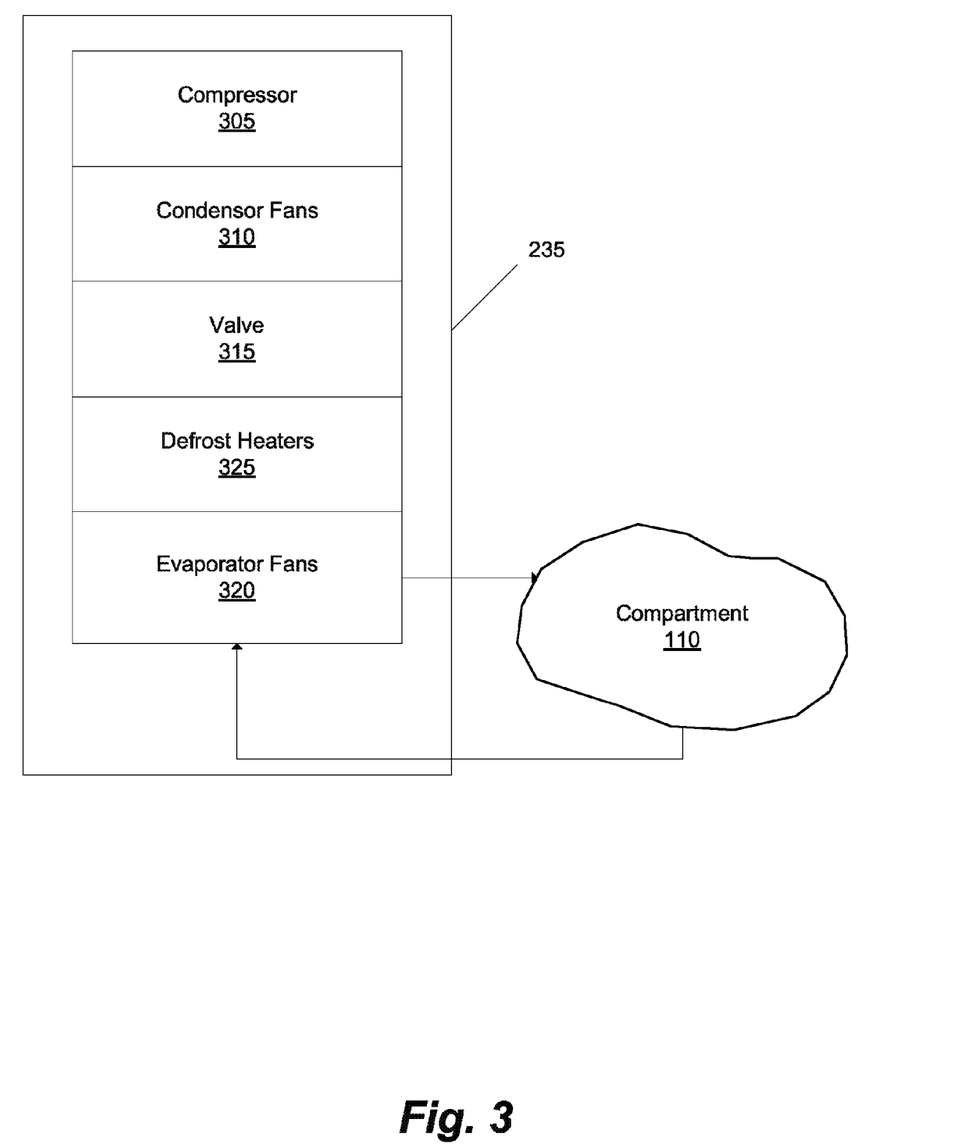
FIG. 3 is a block diagram of system loads of the refrigeration unit of FIG. 2.

As shown in FIG. 3, the system loads 235 include conventional refrigeration elements, such as a compressor 305, condenser fans 310, expansion valve 315, evaporator fans 320, and defrost heaters 325. The system loads 235 are powered from the internal combustion engine 205, as discussed above. The system loads can also be powered by shore power, battery power, or other power source. In the construction shown in FIG. 2, the system loads 235 receive AC power from the power electronics module 220.

The control module 225 is electronically coupled to the power electronics controller 252 and the system loads 235. Before proceeding further, it should be understood that while the control module 225 is discussed herein as a module, the control module 220 can comprise multiple modules.

Figure 4:
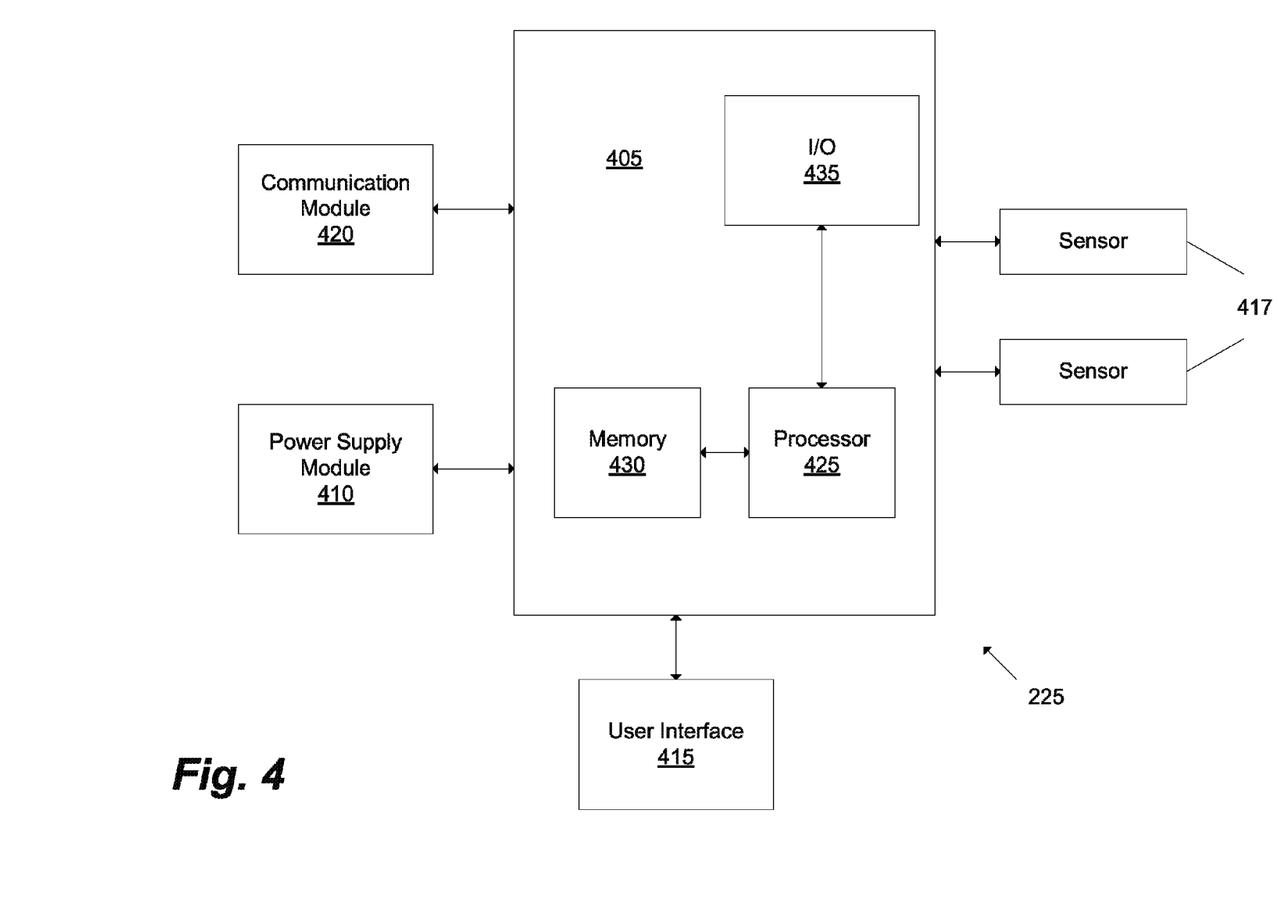
FIG. 4 is a block diagram of a control module of the refrigeration unit of FIG. 2.

As shown in FIG. 4, the control module 225 includes, among other things, a controller 405, a power supply module 410, a user interface 415, a plurality of sensors 417, and a communications module 420. The control module 225 is powered by the battery 230. The controller 405 includes combination of software and hardware that are operable to, among other things, control the operation of the environmental-control system 105. In one construction, the controller 405 includes a printed circuit board ("PCB") that is populated with a plurality of electrical and electronic components that provide power, operational control, and protection to the control module 225. In some constructions, the PCB includes, for example, a processing unit 425 (e.g., a microprocessor, a microcontroller, digital signal processor, or another suitable programmable device), a memory 430, and a bus. The bus connects various components of the PCB including the memory 430 to the processing unit 425. The memory 430 includes, for example, a read-only memory ("ROM"), a random access memory ("RAM"), an electrically erasable programmable read-only memory ("EEPROM"), a flash memory, a hard disk, or another suitable magnetic, optical, physical, or electronic memory device. The processing unit 425 is connected to the memory 430 and executes software that is capable of being stored in the RAM (e.g., during execution), the ROM (e.g., on a generally permanent basis), or another non-transitory computer readable medium such as another memory or a disc. Additionally or alternatively, the memory 430 is included in the processing unit 425. The controller 405 also includes an input/output ("I/O") system 435 that includes routines for transferring information between components within the controller 405 and other components of the control module 225. For example, the communications module 225 is configured to provide communication between the control module 225 and one or more additional devices within the trailer 100 or tractor or external to the trailer 100 or tractor.

Software included in the implementation of the control module 225 is stored in the memory 430 of the controller 405. The software includes, for example, firmware, one or more applications, program data, one or more program modules, and other executable instructions. The controller 405 is configured to retrieve from memory and execute, among other things, instructions related to the control processes and methods described below. For example, the controller 405 is configured to execute instructions retrieved from the memory 430 for monitoring battery health status, predicting battery failure, and communicating the predicted battery failure. In other constructions, the controller 405 or external device includes additional, fewer, or different components.

The PCB also includes, among other things, a plurality of additional passive and active components such as resistors, capacitors, inductors, integrated circuits, and amplifiers. These components are arranged and connected to provide a plurality of electrical functions to the PCB including, among other things, filtering, signal conditioning, or voltage regulation. For descriptive purposes, the PCB and the electrical components populated on the PCB are collectively referred to as the controller 405.

The user interface 415 is included to control the control module 225 or the operation of the refrigeration unit 105 as a whole. The user interface 415 is operably coupled to the controller 405 to control, for example, setting the operation of the refrigeration unit 105 and communicating faults of the environmental-control system 105. The user interface 415 can include a combination of digital and analog input/output devices required to achieve a desired level of interfacing with an operator. For example, the user interface 415 can include a computing device having a display and input devices, a touch-screen display, a plurality of knobs, dials, switches, buttons, faders, or the like.

The sensors 417 sense a plurality of parameters of the compartment 110, the power electronics module 220, or the AC alternator 215. The parameters may be, for example, difference between compartment temperature and set point, compressor 305 speed/capacity, the amount of refrigerant flow, and various operation requirements of the evaporator fans 320 and condenser fans 310. Note that even though FIG. 4 illustrates only two sensors 417, the control module 225 may comprise a plurality of sensors depending on the plurality of parameters sensed.

Figure 5:
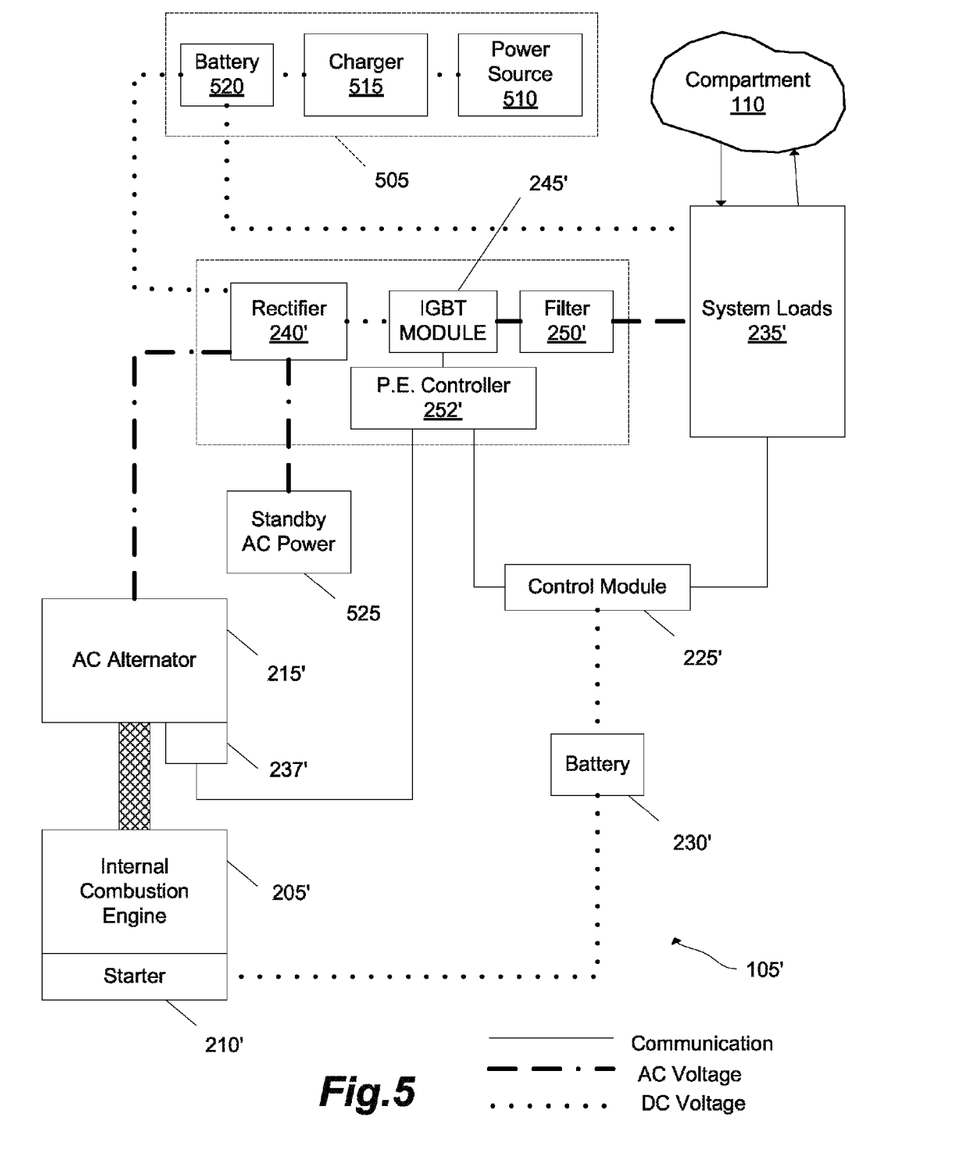
FIG. 5 is a block diagram of a refrigeration unit of the semi-trailer of FIG. 1.

FIG. 5 shows another construction of the refrigeration unit 105', which includes a standby power option 505. The standby power option 505 includes a non-conventional power source 510, a battery charger 515, and a battery 520. The non-conventional power source 510 can be a fuel cell, solar cell, or any other form of a non-conventional energy power source. The battery charger 515 is electrically coupled to the non-conventional power source 510. The battery charger 515 includes a circuit used to charge the battery 520, which is electrically coupled to the battery charger 515. DC power is received by the battery charger 515 from the non-conventional power source 510. The battery charger 515 uses the DC power to charge the battery 520. The DC power from the battery 520 is used to directly or indirectly power the system loads 235'. In the construction shown, the refrigeration unit 105' further includes a standby AC power supply 525. The standby AC power supply 525 can be any standard grid connected AC power supply (i.e., shore power). Once the environmental-control system 105' is plugged into the standby AC power supply 525, consumption from the batteries 230' and 520 is minimized to the smallest consumption possible. The power electronics module 220' automatically detects the mode of operation based on the input terminal power connection (i.e., DC power from battery 520, standby AC power supply 525, or output from AC alternator 215).

In the construction shown in FIG. 5, the power electronics module 220' contains both an input for AC power from the AC alternator 215' or standby AC power supply 525, and an input for DC power from the standby power option 505. The power electronics module 220' converts both the AC and DC power to a regulated AC power output. In one construction, DC power from the standby power option 505 directly powers certain components of the refrigeration unit 235', including the condenser fans 310' and evaporator fans 320'. The other refrigeration unit 235' components are powered by the output AC power from the power electronics module 220'.

The control module 225 is configured to control the system loads 235, and control and/or regulate the AC power supply to the system loads 235. The control module 225 controls the operation of the electrical components of the system loads 235 based on one or more sensed parameters using sensors 417. The control module 225 further controls the power electronics controller 252 based on sensed parameters using sensors 417.

The control module 225 is configured to control the system loads 235 by generating a control signal, based on sensed parameters, to the power electronics controller 252. The power electronics controller 252 interprets the control signal, and controls the output AC power from the power electronics module 220 to the system loads 235 based on the control signal.

The control module 225 is configured to control the system loads 235 by using a "cycle" mode, which starts or speeds up the compressor 305, condenser fans 310, and evaporator fans 320 when a parameter is out of range and regulates the compressor 305, condenser fans 310, and evaporator fans 320 when the parameter is within range. The parameter may be, for example, compartment temperature, compartment humidity, or compartment air quality. In one specific example now discussed, the compressor 205, condenser fans 310, and evaporator fans 320 are sped up after the compartment temperature rises above a first temperature value and are regulated once the compartment temperature falls below a second temperature value, which may be the same as the first temperature value. In one construction the control module controls the speed of the compressor 305, condenser fans 310, and evaporator fans 320 depending on the sensed parameter. In another construction the control module 225 controls the speed of the compressor 205 depending on the sensed parameter, while the condenser fans 310 and evaporator fans 320 are simply powered on or off depending on the sensed parameter and a refrigeration control logic algorithm. Each component of the system load 235 can be controlled and operated differently. For example, when the control module 225 is regulating the components of the system load 235, the condenser fans 310 may be on, while the evaporator fans 320 are off, or the condenser fans 310 may be running at a high speed, while the evaporator fans 320 are running at a low speed.

The control module 225 and the power electronics controller 252 are further configured to control and/or regulate the AC output of the AC alternator 215. Because the internal combustion engine 205 performs differently at different speeds on the road the AC output of the AC alternator 215 must be regulated or stabilized. This is done by the power electronics controller 252 sensing various parameters. The parameters may be, for example, AC output of the AC alternator 215 and AC output of the power electronics module 220. The control module 225 sends a pulse width modulated (PWM) or analog signal, based on the sensed parameters of the system load 235, to the power electronics controller 252. The power electronics controller 252 interprets the signal. Based on the sensed parameters, the power electronics controller 252 calculates the required power levels. The power electronics controller 252 then sends a signal to the alternator voltage regulator 237, which controls/regulates the AC alternator output voltage by adjusting the field current. The control module 225 controlling and/or regulating the AC output of the AC alternator 215 helps stabilize the operation and AC output of the power electronics module 220, which further helps achieve the control requirements of controlling the system loads 235. The power electronics controller 252 further regulates the AC output of the power electronics module 220 by generating control signals to the rectifier 240 and the IGBT module 245, based on the sensed parameters of the system load 235.

Figure 6:
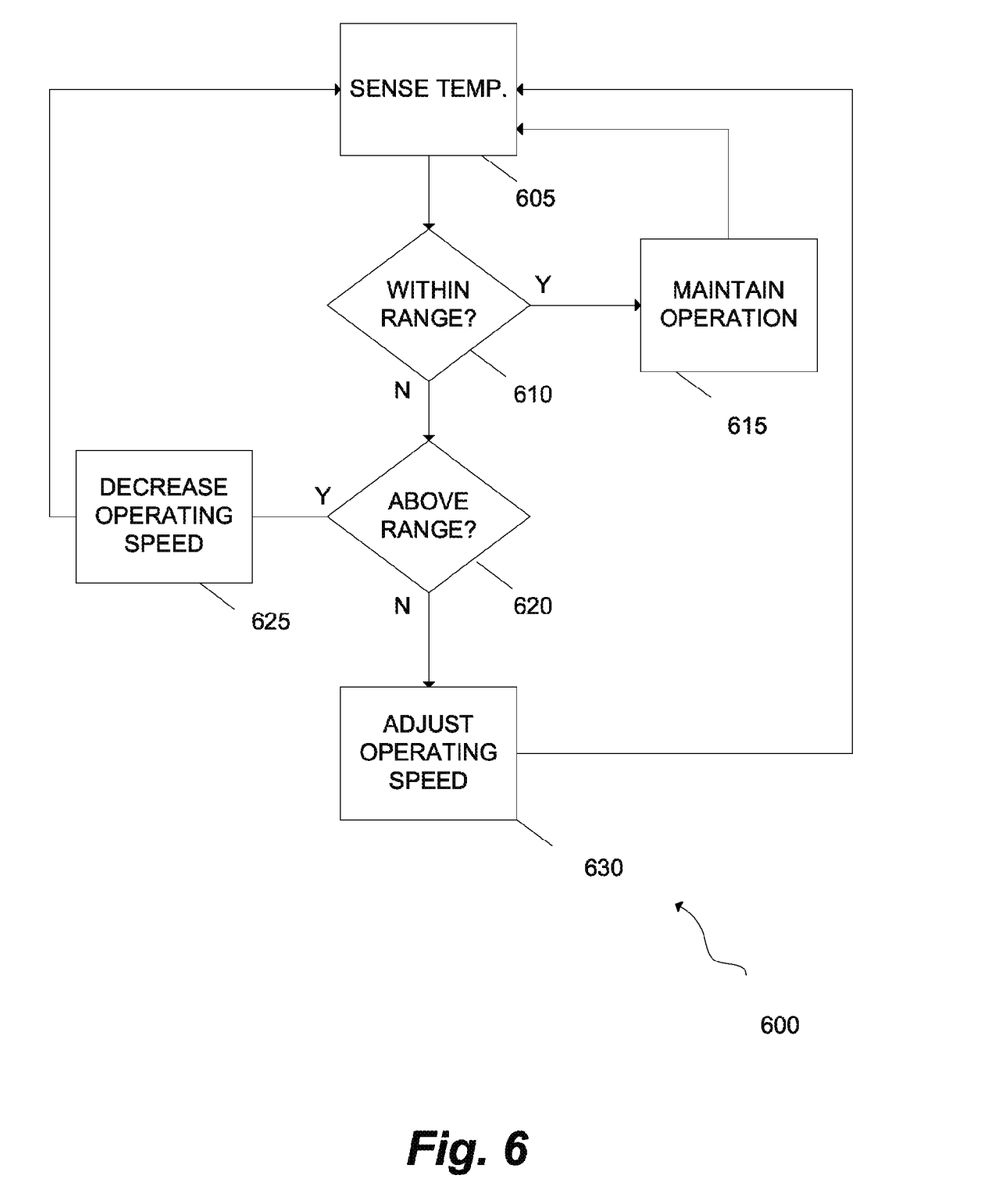
FIG. 6 is a flow diagram of a process for controlling a parameter of the refrigeration unit of FIG. 2.

FIG. 6 is a process 600 for controlling compartment temperature by the refrigeration unit 105. The process 600 is performed when the control module 225 senses the temperature of the compartment 110 (Step 605). The control module 225 determines whether the compartment temperature is out of range (Step 610). If the compartment temperature is within the range, the control module 225 maintains the operating speed of the compressor 305, condenser fans 310, and evaporator fans 320, by maintaining the AC output from the power electronics module 220 (Step 615). If the compartment temperature is out of the range, the control module 225 determines if the compartment temperature is above the range (Step 620). If the compartment temperature is not above the range, meaning the compartment temperature is below the range, the control module 225 decreases the operating speed of the compressor 305, condenser fans 310, and evaporator fans 320 by decreasing the AC output of the power electronics module 220 (Step 625). If the compartment temperature is above the range the control module 225 adjusts the operating speed of the compressor 305, condenser fans 310, and evaporator fans 320 by adjusting the AC output of the power electronics module 220 (Step 630). The control module 225 then cycles back to Step 605. Other parameters of the compartment 110 are controlled in a similar fashion.

Figure 7:
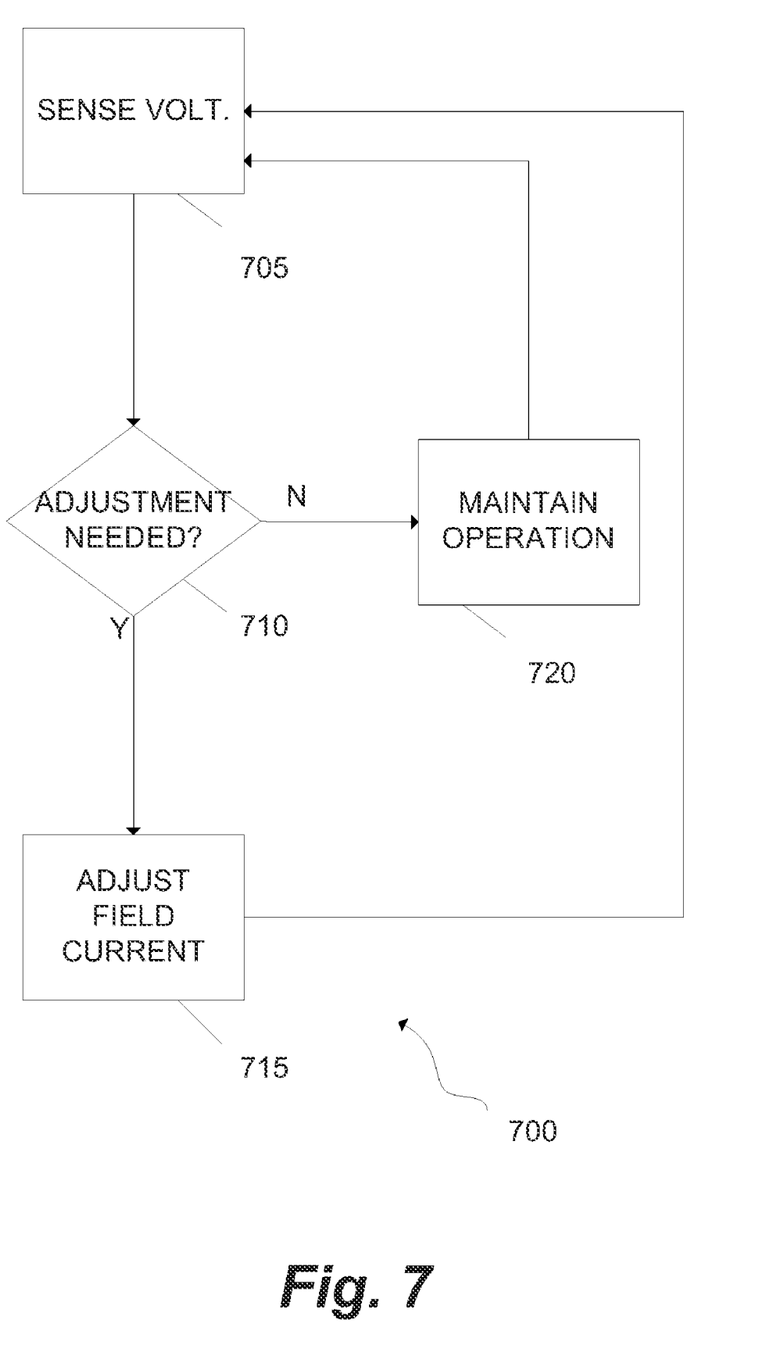
FIG. 7 is a flow diagram of a process for controlling a parameter of the refrigeration unit of FIG. 2.

FIG. 7 is a process 700 for controlling and/or regulating the output AC voltage of the AC alternator 215. The process 700 is performed when the power electronics controller 252 senses the output AC voltage of the AC alternator 215 (Step 705). The power electronics controller 252 then receives a signal from the control module 225 representing parameters of the system load 235, the power electronics controller 252 then determines if the output AC voltage of the AC alternator 215 needs to be adjusted according to the various sensed parameters (Step 710). If the output AC voltage of the AC alternator 215 needs to be adjusted, the power electronics controller 252 sends a signal to the alternator voltage regulator 237 to adjust the field current based on predicted alternator speed using control logic (Step 715). If the output AC voltage of the AC alternator 215 does not need to be adjusted, the power electronics controller 252 maintains the output AC voltage of the AC alternator 215 (Step 720). The power electronics controller 252 then cycles back to step 705.

Thus, the invention provides, among other things, a transport refrigeration unit. Various features and advantages of the invention are set forth in the following claims.

What is claimed is:

1. A mobile environment-controlled unit comprising:
   a chassis;
   a compartment supported by the chassis; and
   an environmental-control system in environmental communication with the compartment, the environmental-control system being configured to control an environmental parameter of the compartment, the environmental-control system including
      an AC alternator powered by an internal combustion engine and to supply electrical power for the environmental-control system;
      a controller configured to
         monitor the environmental parameter of the compartment,
         monitor one or more electrical parameters of the AC alternator,
         control the environmental-control system based on the monitored environmental parameter, and
         determine whether to adjust an output AC voltage of the AC alternator to a new output AC voltage based on the monitored one or more electrical parameters of the AC alternator and on the monitored environmental parameter, determine a predicted alternator speed based on the new output AC voltage when the controller determines to adjust the output AC voltage of the AC alternator to the new output AC voltage, and adjust a field current of the AC alternator based on the predicted alternator speed to stabilize the AC alternator while also meeting the demands of the environmental-control system, wherein the one or more electrical parameters of the AC alternator includes at least one of an AC alternator output voltage and an AC alternator output power.

2. The mobile environment-controlled unit of claim 1 wherein the environmental-control system includes a standby power source.

3. The mobile environment-controlled unit of claim 1 wherein the environmental-control system includes a refrigeration unit supported by the chassis, and wherein the environmental parameter is a temperature of the compartment.

4. The mobile environment-controlled unit of claim 3 wherein the controller is configured to control the refrigeration unit by being further configured to alter the temperature.

5. The mobile environment-controlled unit of claim 1 wherein the one or more electrical parameters of the AC alternator includes an AC alternator speed.

6. The mobile environment-controlled unit of claim 1 wherein the controller is configured to regulate the output AC voltage by adjusting the field current of the AC alternator based on the predicted alternator speed to stabilize the AC alternator while also meeting the demands of the environmental-control system.

7. The mobile environment-controlled unit of claim 1,
   wherein the controller is directly connected to the alternator voltage regulator, and
   wherein the controller is configured to adjust the field current of the AC alternator by sending a signal to the alternator voltage regulator.

8. The mobile environment-controlled unit of claim 1, wherein the AC alternator output voltage is an AC output voltage outputted to a system load and an AC alternator output power is an AC power outputted to the system load.

9. The mobile environment-controlled unit of claim 1, further comprising:
   a power electronics module electrically coupled between the AC alternator and a system load, the power electronics module configured to receive the AC output voltage from AC the alternator and provide a secondary AC output voltage to the system load,
   wherein the power electronics module is configured to calculate a required power level for the system load and send a second signal based on the required power level to the AC alternator to regulate the AC output voltage outputted to the power electronics module based on the second signal.

10. The mobile environment-controlled unit of claim 1, further comprising:
    a power electronics module that includes:
       a rectifier configured to convert the AC alternator output voltage received from the AC alternator into a regulated DC voltage,
       an inverter module configured to invert the regulated DC voltage into a secondary AC output voltage,
       a filter configured to filter the secondary AC output voltage before the secondary AC output voltage reaches a system load, and
       a power electronics controller configured to communicate with the controller and the AC alternator;
    wherein the AC alternator includes an alternator voltage regulator that includes a second rectifier configured to convert part of the AC output voltage into DC voltage to regulate the AC output voltage by adjusting a field current of the AC alternator, and
    wherein the controller is configured to send a signal to the power electronics controller, the power electronics controller is configured to calculate a required power level for the system load and send a second signal based on the required power level to at least one of the alternator voltage regulator, the second rectifier and the inverter, and at least one of the alternator voltage regulator, the second rectifier and the inverter being configured to regulate the AC output voltage based on the second signal.

11. A method of operating a mobile environment-controlled unit comprising
    a chassis,
    a compartment supported by the chassis, and
    an environmental-control system in environmental communication with the compartment, the environmental-control system including an AC alternator powered by an internal combustion engine and to supply electrical power for the environmental-control system, the method comprising:
       monitoring an environmental parameter of the compartment;
       monitoring one or more electrical parameters of the AC alternator;
       determining whether to adjust an output AC voltage of the AC alternator to a new output AC voltage based on the monitored one or more electrical parameters of the AC alternator and on the monitored environmental parameter;
       determining a predicted alternator speed based on the new output AC voltage when the controller determines to adjust the output AC voltage of the AC alternator to the new output AC voltage;

controlling the environmental-control system based on the monitored environmental parameter; and adjusting a field current of the AC alternator based on the predicted alternator speed to stabilize the AC alternator while also meeting the demands of the environmental-control system wherein the one or more electrical parameters of the AC alternator includes at least one of an AC alternator output voltage and an AC alternator output power.

12. The method of claim 11 wherein the environmental-control system includes a standby power source.

13. The method of claim 12 wherein the environmental-control system is a refrigeration unit supported by the chassis, and wherein the environmental parameter is a temperature of the compartment.

14. The method of claim 13 wherein controlling the refrigeration unit alters the temperature.

15. The method of claim 12 wherein the one or more electrical parameters of the AC alternator includes an AC alternator speed.

16. The method of claim 12 wherein adjusting the field current of the AC alternator based on the predicted alternator speed to stabilize the AC alternator while also meeting the demands of the environmental-control system regulates an output AC voltage.

17. The method of claim 11, wherein adjusting the field current of the alternator includes sending a signal to an alternator voltage regulator of the alternator.

18. A mobile environment-controlled unit comprising:
a chassis;
a compartment supported by the chassis; and
an environmental-control system in environmental communication with the compartment, the environmental-control system being configured to control an environmental parameter of the compartment, the environmental parameter including at least the temperature of the compartment, the environmental-control system including:

an AC alternator powered by an internal combustion engine and to supply electrical power for the environmental-control system, wherein the AC alternator includes an alternator voltage regulator configured to regulate an AC output voltage by adjusting a field current of the AC alternator;

a controller configured to:
monitor the environmental parameter of the compartment,
monitor one or more parameters of the AC alternator, the one or more parameters including at least one of an AC alternator output voltage and an AC alternator output power,
determine whether to adjust an output AC voltage of the AC alternator to a new output AC voltage based on the monitored one or more electrical parameters of the AC alternator and on the monitored environmental parameter, determine a predicted alternator speed based on the new output AC voltage when the controller determines to adjust the output AC voltage of the AC alternator to the new output AC voltage, and adjust the field current of the AC alternator based on the predicted alternator speed to stabilize the AC alternator while also meeting the demands of the environmental-control system,
wherein the controller is directly connected to the alternator voltage regulator, and
wherein the controller is configured to adjust the field current of the AC alternator by sending a signal to the alternator voltage regulator.

19. The mobile environment-controlled unit of claim 18 wherein the environmental-control system includes a standby power source.

20. The mobile environment-controlled unit of claim 18 wherein the environmental-control system includes a refrigeration unit supported by the chassis, and wherein the environmental parameter is a temperature of the compartment.

* * * * *